United States Patent
Hanson et al.

(10) Patent No.: US 9,476,712 B2
(45) Date of Patent: Oct. 25, 2016

(54) MEMS DEVICE MECHANISM ENHANCEMENT FOR ROBUST OPERATION THROUGH SEVERE SHOCK AND ACCELERATION

(71) Applicant: Honeywell International Inc., Morristown, NJ (US)

(72) Inventors: Timothy J. Hanson, Plymouth, MN (US); Mark W. Weber, Zimmerman, MN (US); Max C. Glenn, Chanhassen, MN (US); Drew A. Karnick, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 388 days.

(21) Appl. No.: 13/956,048

(22) Filed: Jul. 31, 2013

(65) Prior Publication Data

US 2015/0033849 A1    Feb. 5, 2015

(51) Int. Cl.
G01C 19/56    (2012.01)
G01C 19/574    (2012.01)
G01C 19/5783    (2012.01)
G01P 15/08    (2006.01)

(52) U.S. Cl.
CPC ......... *G01C 19/574* (2013.01); *G01C 19/5783* (2013.01); *G01P 2015/0871* (2013.01); *Y10T 29/49002* (2015.01)

(58) Field of Classification Search
CPC .... G01C 19/56; G01C 25/00; G01C 19/574; Y10T 29/49002
See application file for complete search history.

(56) References Cited

U.S. PATENT DOCUMENTS

| 6,065,341 | A * | 5/2000 | Ishio ................. B81B 3/0051 361/283.3 |
|---|---|---|---|
| 6,782,748 | B2 | 8/2004 | Weber et al. |
| 6,865,944 | B2 | 3/2005 | Glenn et al. |
| 8,186,220 | B2 | 5/2012 | Geisberger et al. |
| 8,393,212 | B2 | 3/2013 | Ge et al. |
| 2003/0066351 | A1* | 4/2003 | Weinberg ........... G01C 19/5719 73/504.16 |
| 2004/0089069 | A1 | 5/2004 | Weber et al. |
| 2004/0112133 | A1 | 6/2004 | Glenn et al. |

(Continued)

FOREIGN PATENT DOCUMENTS

EP    2824066    1/2015

OTHER PUBLICATIONS

Cheng et al., "Bulk-Si with Poly Bump Process Scheme for MEMS Sensors", "IEEE", Aug. 2012, pp. 1-4.
Geiger et al., "A Mechanically Controlled Oscillator", "Sensors and Actuators 82", Oct. 1999, pp. 74-78.
De Boer, "Surface Forces in MEMS—Adhesion and Friction Experiments", Sep. 2009, pp. 1-38, Publisher: Sandia National Laboratories.

(Continued)

*Primary Examiner* — John Chapman, Jr.
(74) *Attorney, Agent, or Firm* — Fogg & Powers LLC

(57) ABSTRACT

A micro-electro-mechanical systems (MEMS) device comprises at least one proof mass configured to have a first voltage and a motor motion in a first horizontal direction. At least one sense plate is separated from the proof mass by a sense gap, with the sense plate having an inner surface facing the proof mass and a second voltage different than the first voltage. A set of stop structures are on the inner surface of the sense plate and are electrically isolated from the sense plate. The stop structures are configured to prevent contact of the inner surface of the sense plate with the proof mass in a vertical direction. The stop structures have substantially the same voltage as that of the proof mass, and are dimensioned to minimize energy exchange upon contact with the proof mass during a shock or acceleration event.

17 Claims, 11 Drawing Sheets

(56) References Cited

U.S. PATENT DOCUMENTS

| | | |
|---|---|---|
| 2009/0249873 A1 | 10/2009 | Delevoye |
| 2009/0320592 A1 | 12/2009 | Glenn |
| 2012/0125747 A1* | 5/2012 | Chu ..................... H01P 1/127 200/181 |
| 2013/0276536 A1* | 10/2013 | Kanemoto ......... G01C 19/5762 73/504.12 |
| 2015/0007656 A1 | 1/2015 | Weber et al. |

OTHER PUBLICATIONS

European Patent Office, "Extended European Search Report", from Foreign Counterpart of U.S. Appl. No. 13/956,048, Apr. 28, 2015, pp. 1-7, Published in: EP.

European Patent Office, "EP Office Action from from EP Application No. 14177565.0 mailed Jan. 11, 2016", from Foreign Counterpart of U.S. Appl. No. 13/956,048, Jan. 11, 2016, pp. 1-5, Published in: EP.

* cited by examiner

MEMS DEVICE MECHANISM ENHANCEMENT FOR ROBUST OPERATION THROUGH SEVERE SHOCK AND ACCELERATION

BACKGROUND

Micro-Electro-Mechanical Systems (MEMS) devices can include various sensors, such as gyroscopes and accelerometers, which can be implemented in various control system and inertial navigation applications, such as in an Inertial Measurement Unit (IMU). A MEMS gyroscope or accelerometer may include microstructure sense elements such as a proof pass interposed between a pair of sense plates, forming a capacitive sensor.

The operation of a MEMS sensor can be disrupted or stopped when subjected to very high levels of shock or vibration. One identified cause for this operational failure is contact between the proof mass and one or both of the sense plates that the proof mass oscillates. When a proof mass to sense plate contact occurs, charge is exchanged and disruption or loss of the sensor signal can result.

Currently, MEMS sensors rely primarily on the proof mass supporting springs, having stiffness in the direction perpendicular to the proof mass plane, to prevent the proof mass from touching the sense plates. Other attempted solutions for preventing proof mass touch to sense plate include electrical damping, and gas damping by filling the evacuated void of the sensor cavity with a rarified gas. However, both of these solutions can be defeated when acceleration forces seen at the sensor exceed certain levels, as presented in certain applications.

In other approaches, the sensor proof mass is held stationary or nearly stationary during high adverse acceleration, and then released for normal operation after the disturbance has passed. The sensor, however, is non-operational during the period of being held stationary.

SUMMARY

A MEMS device comprises at least one proof mass having a first surface and an opposing second surface, the proof mass configured to have a first voltage and a motor motion in a first horizontal direction. At least one sense plate is separated from the proof mass by a sense gap, with the sense plate having an inner surface facing the first surface of the proof mass and a second voltage different than the first voltage. A set of stop structures is on the inner surface of the sense plate and electrically isolated from the sense plate. The stop structures are configured to prevent contact of the inner surface of the sense plate with the proof mass in a vertical direction. The stop structures have substantially the same voltage as that of the proof mass, and are dimensioned to minimize energy exchange upon contact with the proof mass during a shock or acceleration event.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
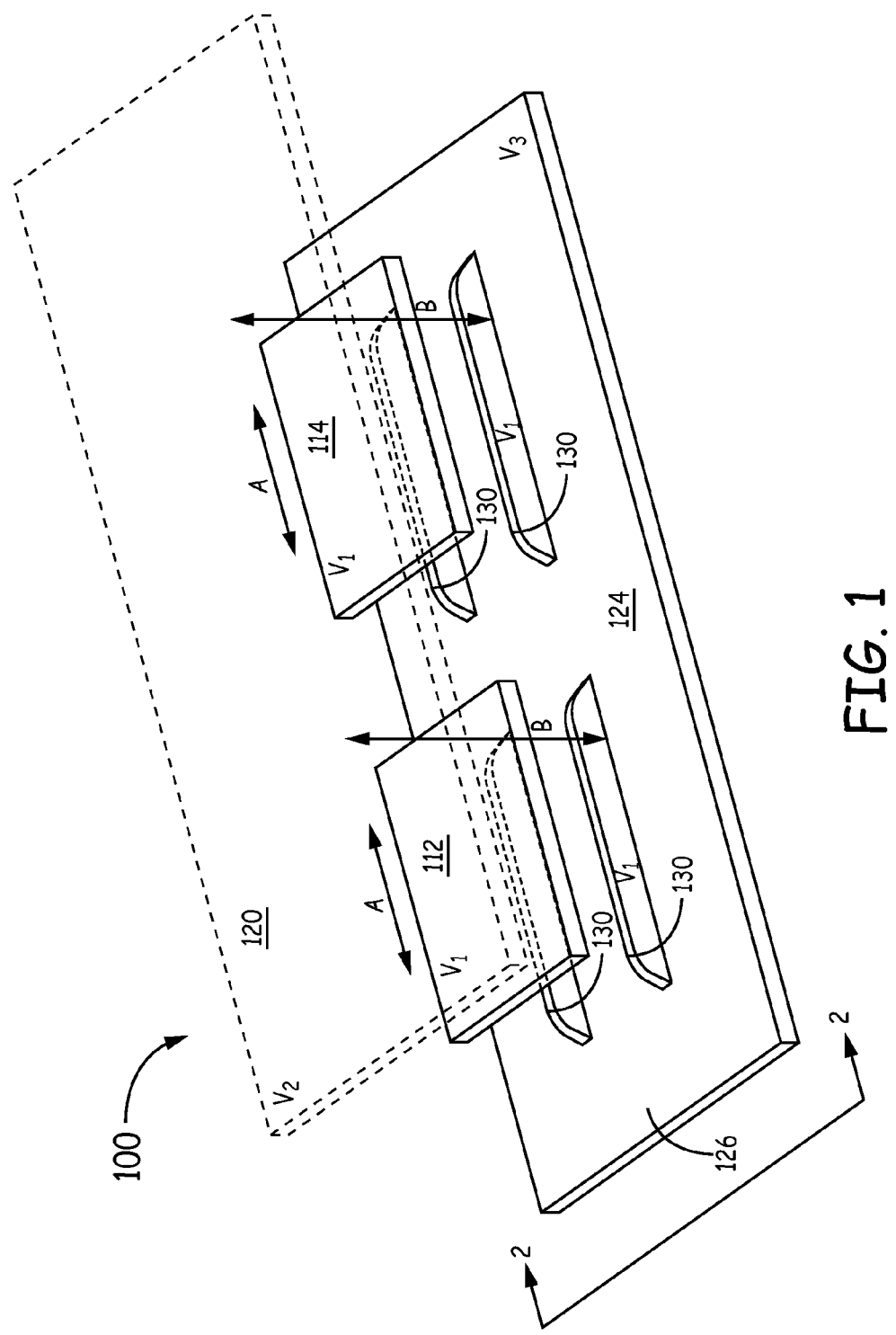
FIG. 1 is a perspective view of a MEMS sensor device according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An internal mechanism enhancement is provided for Micro-Electro-Mechanical Systems (MEMS) devices that allows for robust operation of the MEMS devices through severe shock and acceleration events. The internal mechanisms prevent contact or touch of various components in the MEMS device that result in lost sensor performance, both during and after shock or acceleration events, resulting in improved operational tolerance during such events.

The present approach involves the addition of plurality of stop structures in a MEMS sensor device having one or more proof masses such as a pair of opposing proof masses positioned apart from at least one sense plate. One set of stop structures prevents proof mass to sense plate contact in a vertical direction perpendicular to the plane of motor motion of the proof mass. Additional stop structures can be added between the proof mass and sense or motor-related combs to prevent the combs from touching each other during operation. The stop structures constrain the vertical and horizontal motion of the proof mass during operation in a way that is not electrically disruptive, while minimizing mechanical disruption. This allows the MEMS sensor device to operate robustly through a high-acceleration or shock event.

The stop structures are configured to be at the same electrical potential as that of the proof mass, such that contact of the operational oscillating proof mass with the stop structures does not result in electrical discharge or charge transfer. Also, contact by the proof mass with the stop structures results in near-zero frictional momentum loss, enabling the proof mass to continue oscillating after contact with the stop structures without significant loss in proof mass momentum, thereby preventing or minimizing disruption in sensor operation.

In general, the stop structures are located and sized to not interfere with operation of the MEMS sensor under normal environmental and vibration conditions. When shock is applied, and in the case where the proof mass and/or other mechanism displacement(s) extend far outside of normal operational displacements and approach other internal structures, the stop structures arrest further displacement in a predictable manner. The stop structures also provide for minimal time of contact if touches occur, and maximize restorative forces to a neutral position at point of contact.

The stop structures have a height such that restorative forces acting on the proof mass are maintained, and stick-down of the proof mass to the sense plate is prevented while maintaining maximum free travel of the proof mass within the sense gap. The stop structures can be formed such that their height is selected to allow maximum proof mass displacement before contact of the stop structures by the proof mass, while also ensuring the maximizing of proof mass restoration force at the maximum proof mass displacement. In addition, the stop structures can be formed to have a size and shape to minimize frictional loss of proof mass momentum upon touch between the proof mass and the stop structures.

The present stop structures can be added to various MEMS sensor devices. For example, various configurations of MEMS gyroscopes can be implemented with the stop structures, such as an in-plane gyroscope (IPG) or upper sense plate (USP) gyroscope, an out-of-plane gyroscope (OPG), or the like. In addition, the stop structures can be added to various MEMS accelerometers to mitigate the risk of proof-mass stick-down during acceleration events.

In one embodiment, stop structures are located in the "z" direction (out of plane) to prevent proof mass to upper/lower sense plates touches. Additional stop structures are located along the proof mass plane, in a "y" direction perpendicular to the motor ("x") direction, to prevent the gap motor drive and motor pick-off combs from touching. Such a configuration of stop structures can be applied to a USP gyroscope, for example.

In another embodiment, stop structures are located in the "z" direction to prevent proof mass to upper/lower sense plates touches, and to prevent motor drive plate to proof mass touches. Additional stops are located in the proof mass plane, in a "y" direction perpendicular to the motor direction, to prevent sense comb touches. Such a configuration of stop structures can be applied to an OPG, for example.

The present approach is described in further detail hereafter with respect to the drawings.

Figure 2:
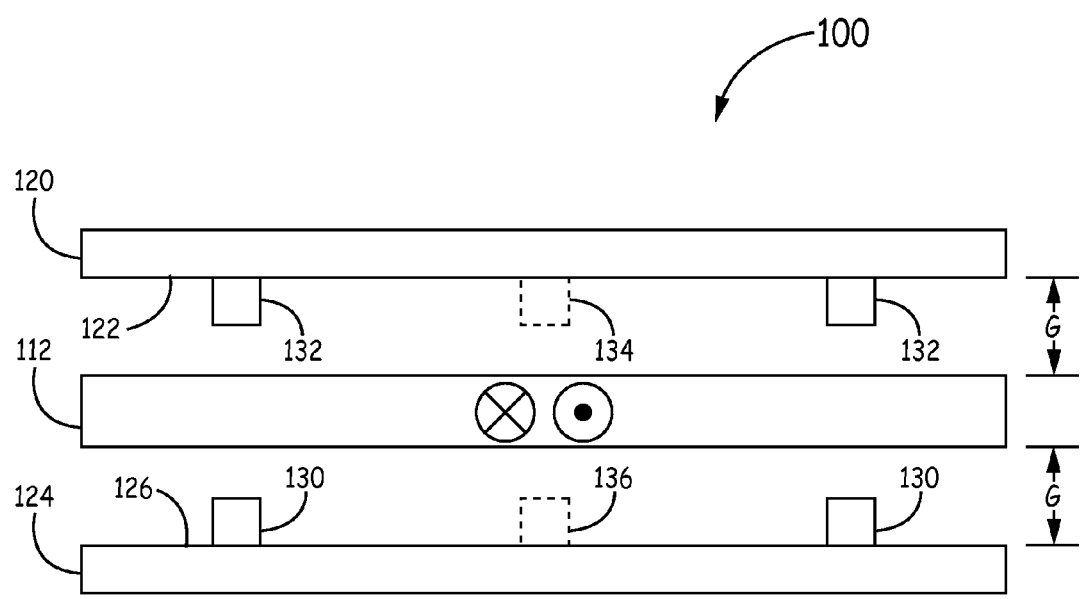
FIG. 2 is an end view of the MEMS sensor device of FIG. 1.

FIGS. 1 and 2 are schematic depictions of a MEMS sensor 100 according to one embodiment. The MEMS sensor 100 includes a first proof mass 112 and a second proof mass 114, which are positioned apart from at least one sense plate. In one embodiment, proof masses 112 and 114 are positioned apart from a first sense plate 124 (FIG. 1). In another embodiment, proof masses 112 and 114 are positioned between first sense plate 124 and a second sense plate 120. The proof mass can be composed of a silicon material. The sense plates 120 and 124 are typically composed of a glass substrate material that is overlaid with a metallization layer.

The proof masses 112 and 114 each have a first voltage (V1), sense plate 120 has a second voltage (V2), and sense plate 124 has a third voltage (V3), as indicated in FIG. 1. During operation of MEMS sensor 100, proof masses 112 and 114 have a motor motion in a horizontal direction, as indicated by the arrows (A), and also have motion in a vertical direction toward sense plates 120 and 124, as indicated by the arrows (B), which occurs during sensing and shock conditions. The motor motion of proof mass 112 is indicated in the end view of FIG. 2 (in and out of the page) by the symbols (X) and (•).

The MEMS sensor 100 incorporates a plurality of stop structures 130 located on an inner surface 126 of sense plate 124 to prevent touch or contact of proof masses 112 and 114 with sense plate 124 under shock conditions. As shown in FIG. 2, a plurality of stop structures 132, corresponding to and positioned above stop structures 130, are also located on an inner surface 122 of sense plate 120 to prevent contact of proof masses 112 and 114 with sense plate 120 under shock conditions. The stop structures 130, 132 are shaped like a rail and have a rectangular end view profile. The proof mass 112 is separated from sense plate 120 and sense plate 124 by sense gaps (G).

The stop structures 130, 132 are configured to have a voltage (V1) that matches the voltage of proof masses 112, 114 (V1), such that it is not electrically disruptive to MEMS sensor 100 if the stop structures touch the proof masses during operation. While the stops structures can be aligned vertically as shown in the exemplary embodiment of FIG. 2, the stop structures can also be positioned to have non-vertical alignment with respect to each other in other embodiments.

Figure 3:
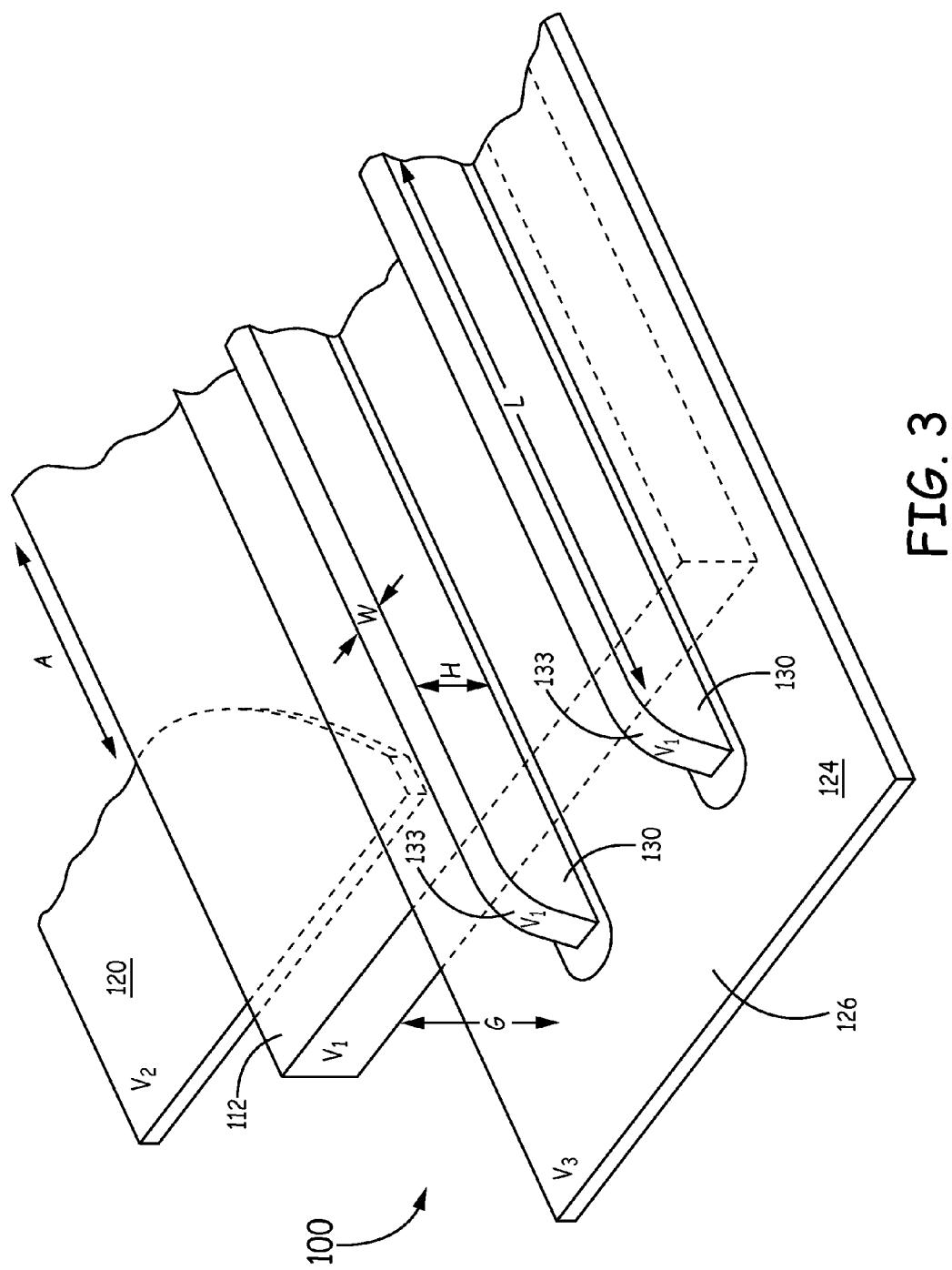
FIG. 3 is an enlarged perspective view of a portion of the MEMS sensor device of FIG. 1.

FIG. 3 illustrates further details of MEMS sensor 100, including portions of proof mass 112, sense plate 120, and sense plate 124. The stop structures 130 on inner surface 126 of sense plate 124 each have a length (L) that can range from about 1% to about 120% of the length of the proof mass. The stop structures 130 can have an orientation such that the stop structure length is substantially parallel to the direction of normal proof mass motor motion (A). The stop structures 130 have a very narrow width (W), which in one example is about 0.1 to about 2 times the dimension of the sense gap (G).

The stop structures 132 on sense plate 120 (FIG. 2) have the same dimensional configurations as stop structures 130. The stop structures 130, 132 have a height (H) above the plane of the sense plates on the order of about 1% to about 25% of the dimension of the sense gap (G) between the sense plates and the proof mass. The ratio of the area of stop structures 130, 132 to the area of the sense plates is very small, for example about 5% or less.

In order to accomplish a near-zero frictional touch of the proof mass with the stop structures while MEMS sensor 100 is operational, the shape of stop structures 130, 132 is formed so that no sharp edges exist on any surfaces facing the proof mass. For example, the stop structures can have rounded corners 133, as shown in FIG. 3, to reduce friction. In addition, the width of the stop structures is chosen to enable ease of fabrication while minimizing friction during contact by the proof masses.

The stop structures can be formed by standard etching processes. For example, the stop structures can be fabricated on the sense plates using a process similar to a Reactive Ion Etch (REI) process by which mesas are created (REI mesa etch). The resulting stop structures can be composed of the same glass substrate material as the sense plate glass, but without the overlaid metallization covering used on the sense plates. This allows the stop structures to be electrically isolated from the sense plates, while being tied electrically to the same potential as that of the proof mass. In another embodiment, the stop structures can be composed of the same material as that of the proof-mass itself, while again being tied electrically to the same potential as that of the proof mass Alternatively, the stop structures can be formed by standard deposition processes. For example, a glass or other material can be deposited on the inner surface of the sense plates to build up rail-shaped stop structures.

It should be understood that additional stop structures can be employed on the sense plates as needed for a given application. For example, in an alternative embodiment shown in FIG. 2, a stop structure 134 can be added to a central portion of inner surface 122 of sense plate 120 over proof mass 112 and between stop structures 132. Likewise, a stop structure 136 can be added to a central portion of inner surface 126 of sense plate 124 over proof mass 112 and between stop structures 130.

Figure 4:
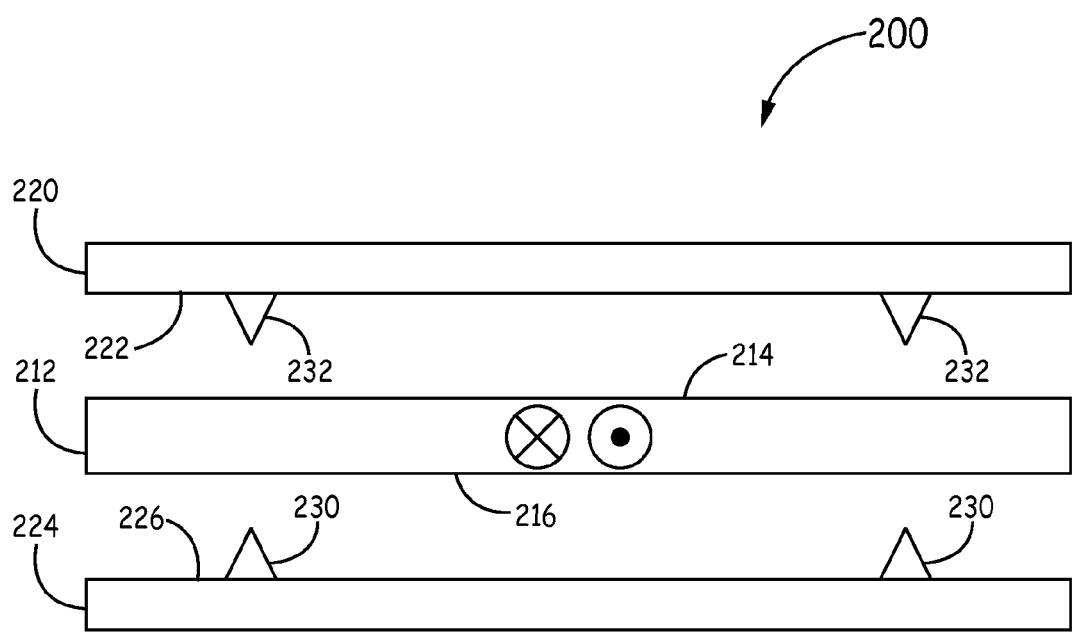
FIG. 4 is an end view of a MEMS sensor device according to an alternative embodiment.

FIG. 4 illustrates another embodiment of a MEMS sensor 200, which includes similar features as MEMS sensor 100. For example, MEMS sensor 200 includes a proof mass 212, having a first surface 214 and an opposing second surface 216. The proof mass 212 is positioned between an upper sense plate 220 and a lower sense plate 224. The MEMS sensor 200 also has a plurality of stop structures 230 located on an inner surface 226 of sense plate 224. A plurality of stop structures 232, corresponding to and positioned above stop structures 230, are located on an inner surface 222 of sense plate 220.

The stop structures 230, 232 are configured to have a voltage that matches the voltage of proof mass 112 such that it is not electrically disruptive to MEMS sensor 200 if the stop structures touch the proof mass during operation. The stop structures 230, 232 can each have a length that is substantially the same length as that of proof mass 312 along the motor motion direction, or can have a shorter length, down to a length less than about 1% the length of the proof mass. As shown in FIG. 4, stop structures 230, 232 have a triangular shaped end view profile, which provides a knife-edge type engagement with proof mass 212 upon contact. This results in less surface area contact by the stop structures and less frictional loss.

Figure 5:
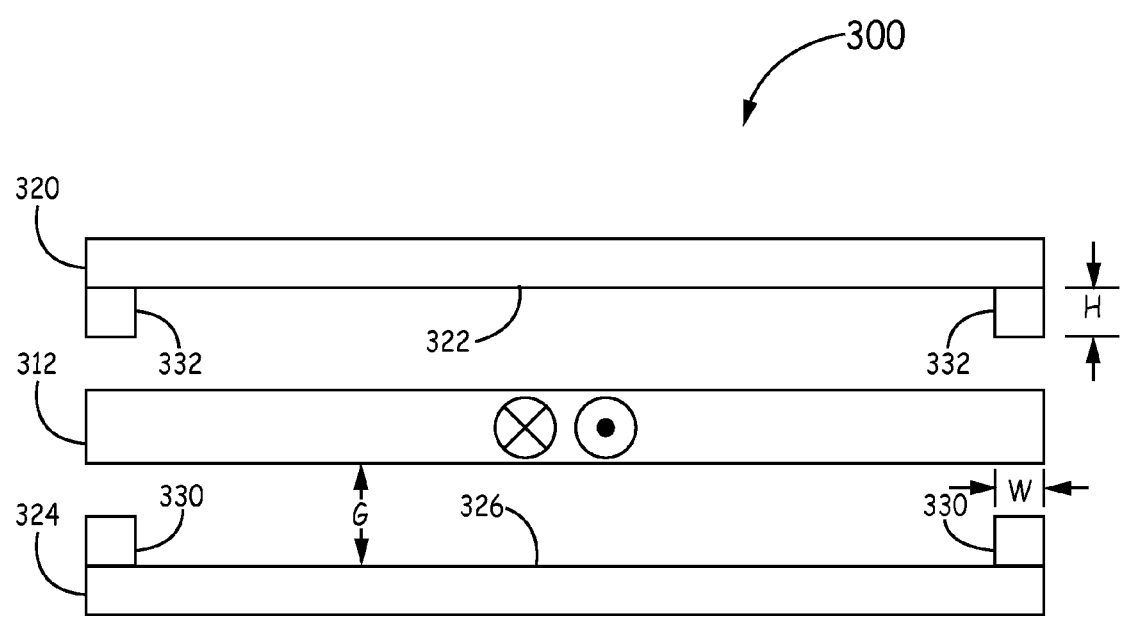
FIG. 5 is an end view of a MEMS sensor device according to another embodiment.

FIG. 5 illustrates another embodiment of a MEMS sensor 300, which includes similar features as MEMS sensor 100. For example, MEMS sensor 300 includes a proof mass 312, which is positioned between an upper sense plate 320 and a lower sense plate 324. The MEMS sensor 300 also has a plurality of stop structures 330 located on an inner surface 326 of sense plate 324. A plurality of stop structures 332, corresponding to and positioned above stop structures 330, are located on an inner surface 322 of sense plate 320.

The stop structures 330, 332 are configured to have a voltage that matches the voltage of proof mass 312. As shown in FIG. 5, stop structures 330 are positioned along opposing edges of inner surface 326 of sense plate 324, and stop structures 332 are positioned along opposing edges of inner surface 322 of sense plate 320. The stop structures 330, 332 can each have a length that is substantially the same length as that of proof mass 312 along the motor motion direction. Alternatively, the stop structures 330, 332 can be segmented such that a shortened stop structure is positioned adjacent to each corner of the proof mass. Such shortened stop structures can have a length that is about 1% to about 10% of the proof mass width perpendicular to the motor motion direction, in one example. In an exemplary embodiment, the height (H) of stop structures 330, 332 can be about 1% to about 25% of the dimension of the sense gap (G), and the width (W) of the stop structures can be about 0.1 to about 2 times the size of the sense gap (G).

While stop structures 330, 332 are shown having a rectangular shaped end view profile, these stop structures can be configured to have a triangular shaped end view profile in an alternative embodiment, such as shown in FIG. 4. Further, the specific end view profile shape of the extreme top of the stop structure can be triangular, flat, rounded, or other shapes such that the contact area of the stop structure to the proof mass is controlled.

Figure 6:
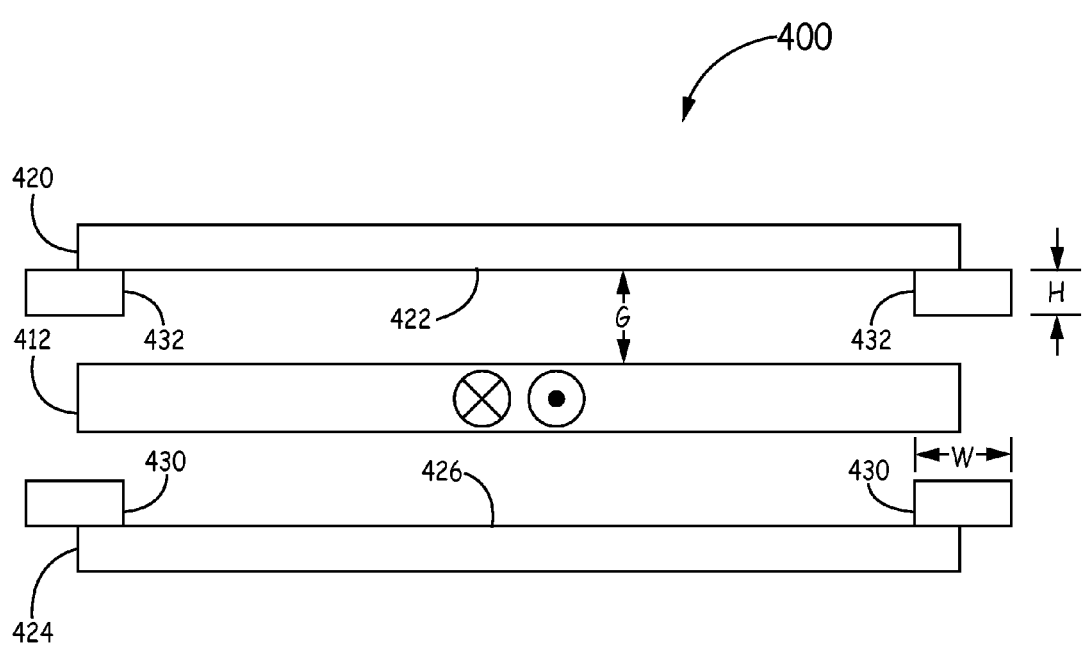
FIG. 6 is an end view of a MEMS sensor device according to a further embodiment.

FIG. 6 illustrates another embodiment of a MEMS sensor 400, which includes similar features as MEMS sensor 100. For example, MEMS sensor 400 includes a proof mass 412, which is positioned between an upper sense plate 420 and a lower sense plate 424. The MEMS sensor 400 also has a plurality of stop structures 430 located on an inner surface 426 of sense plate 424. A plurality of stop structures 432, corresponding to and positioned above stop structures 430, are located on an inner surface 422 of sense plate 420.

The stop structures 430, 432 are configured to have a voltage that matches the voltage of proof mass 412. As shown in FIG. 6, stop structures 430 are positioned along opposing edges of inner surface 426 of sense plate 424 such that a portion of stop structures 430 extends beyond each of the edges. Likewise, stop structures 432 are positioned along opposing edges of inner surface 422 of sense plate 420 such that a portion of stop structures 432 extends beyond each of the edges. This configuration of the stop structures provides additional design flexibility to insert stop structures suspended from an area external to the sense gap volume between.

The stop structures 430, 432 can each have a length that is shorter than, or substantially the same length as that of proof mass 412 along the motor motion direction. The stop structures 430, 432 have a height (H) sufficient to prevent electrostatic "stick-down" but are still low enough to allow maximum free space in gap (G) for maximum rate of operation, with margin, under expected vibration and static accelerations (e.g., up to about 500-800 gs). The stop structures 430, 432 have a width narrow enough to minimize the surface area of proof mass PM to stop structure contact, but wide enough to avoid breakage/chipping and fabrication difficulties. For example, the height (H) can be about 1% to about 25% of the sense gap (G), and the width (W) can be about 0.1 to about 2 times the size of the sense gap (G).

Figure 7:
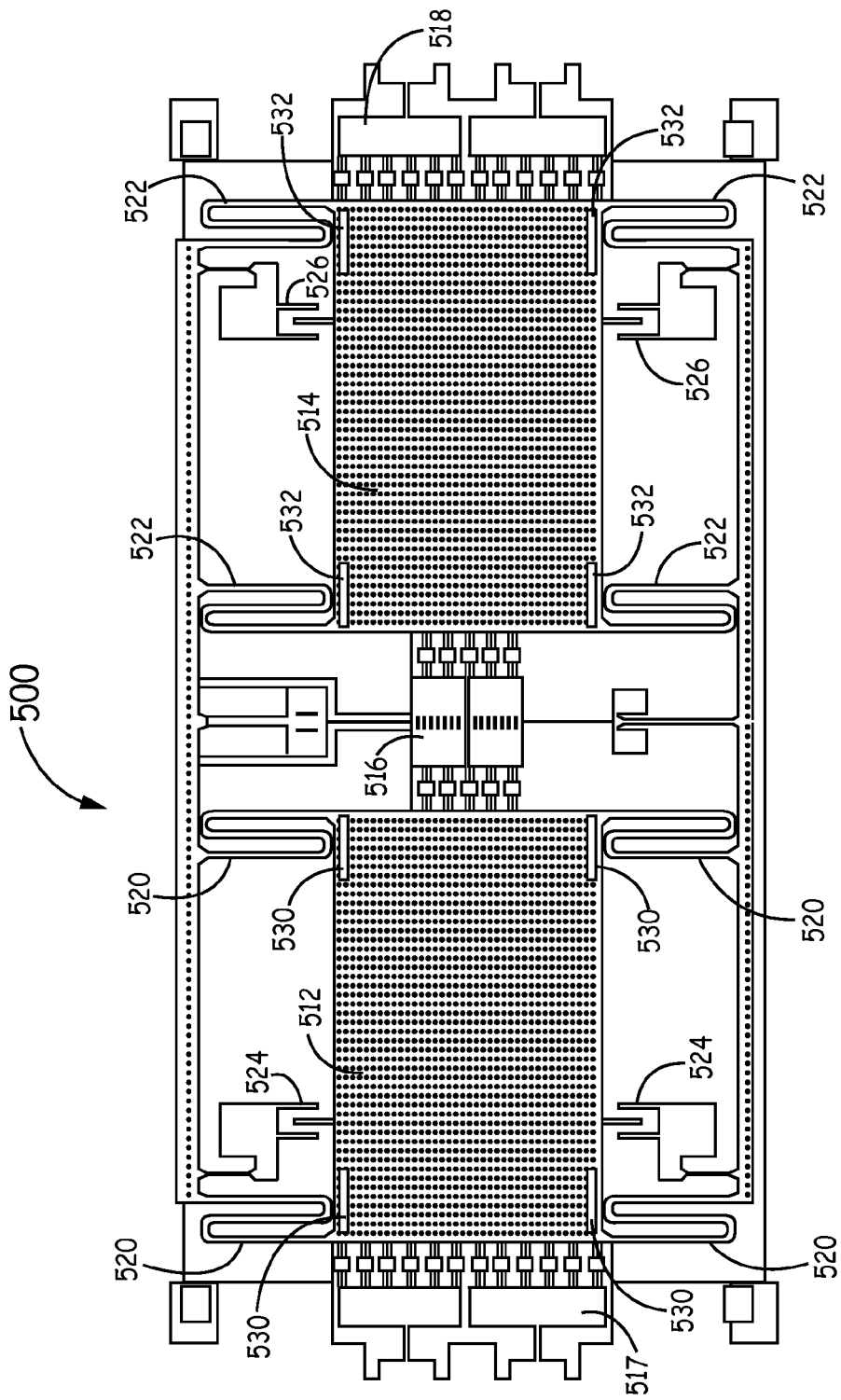
FIG. 7 is a top view of a MEMS gyroscope according to one embodiment.

FIG. 7 shows a MEMS gyroscope 500 according to one embodiment, which implements stop structures similar to those described above with respect to FIG. 5. The MEMS gyroscope 500 includes a first proof mass 512 and a second proof mass 514 positioned adjacent to each other in an aligned configuration. A motor pick-off mechanism 516 is coupled between proof mass 512 and proof mass 514. A motor drive mechanism 517 is coupled to proof mass 512, and a motor drive mechanism 518 is coupled to proof mass 514, on opposite sides from motor pick-off mechanism 516. A set of spring mechanisms 520 are each coupled to respective corners of proof mass 512, and a set of spring mechanisms 522 are each coupled to respective corners of proof mass 514. The spring mechanisms 520 and 522 respectively allow for the oscillating motion of the proof masses 512 and 514. In addition, a pair of Newton stops 524 are located near opposing edges of proof mass 512, and pair of Newton stops 526 are located near opposing edges of proof mass 514. The Newton stops 524 and 526 respectively constrain the movement of proof masses 512 and 514 in the direction of the motor motion.

As illustrated in FIG. 7, separate stop structures 530 are located near each corner of proof mass 512 on an overlying sense plate (not shown). Four additional stop structures corresponding to stop structures 530 are also located below proof mass 512 on an underlying sense plate, such that a total of eight stop structures are associated with proof mass 512. Likewise, stop structures 532 are located near each corner of proof mass 514 on an overlying sense plate (not shown). Four additional stop structures corresponding to stop structures 532 are also located below proof mass 514 on an underlying sense plate such that a total of eight stop structures are associated with proof mass 514. The stop structures constrain the proof mass out of plane motion by physical contact, without the loss of proof mass electrical charge, or loss of significant proof mass momentum, during operation of the gyroscope.

Figure 8:
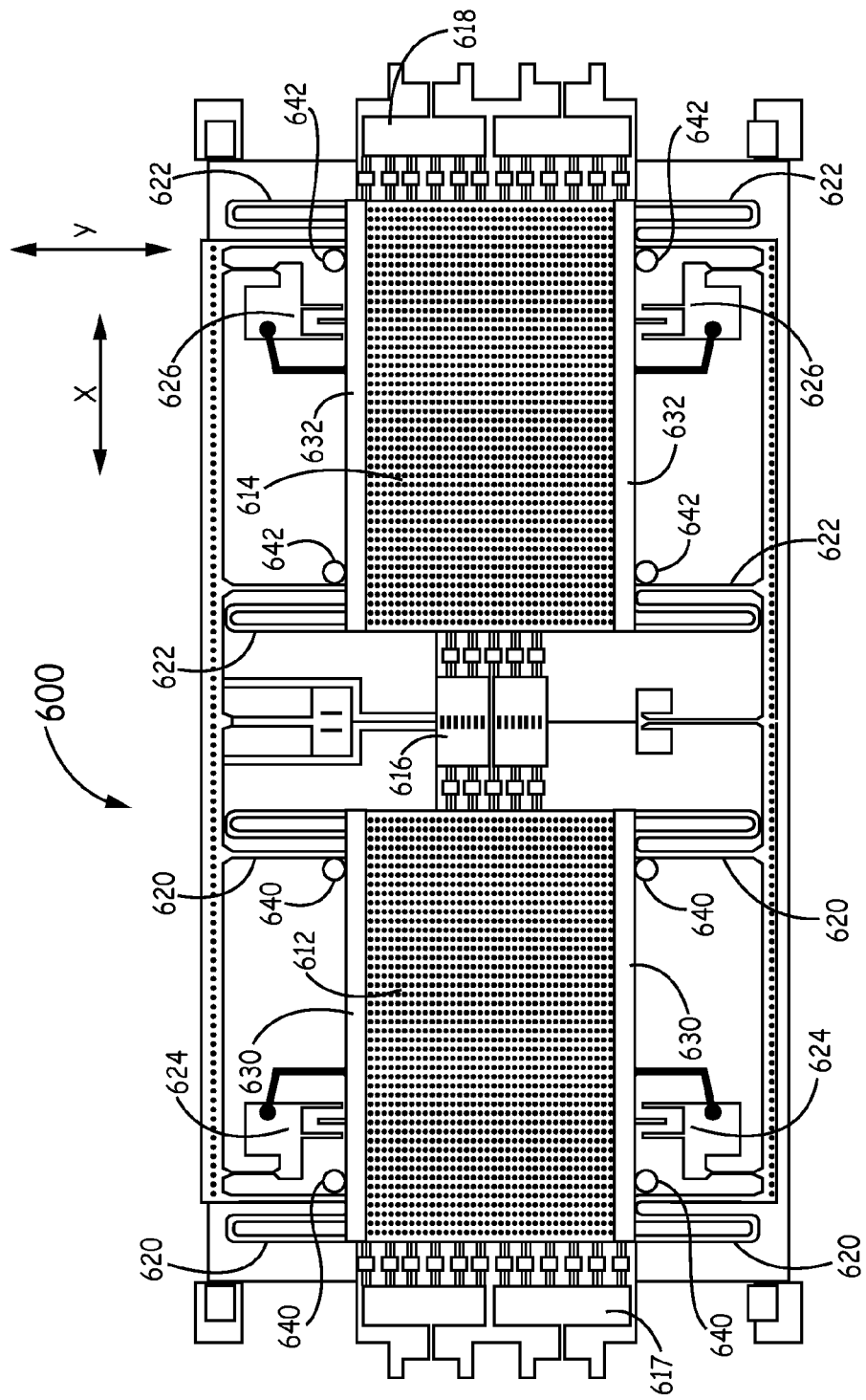
FIG. 8 is a top view of a MEMS gyroscope according to another embodiment.

FIG. 8 depicts a MEMS gyroscope 600 according to another embodiment, which implements stop structures similar to those described above with respect to FIG. 7. The MEMS gyroscope 600 includes a first proof mass 612 and a second proof mass 614 positioned adjacent to each other in an aligned configuration. A pick-of mechanism 616 is coupled between proof mass 612 and proof mass 614. A motor drive mechanism 617 is coupled to proof mass 612, and a motor drive mechanism 618 is coupled to proof mass 614, on opposite sides from pick-of mechanism 616. A set of spring mechanisms 620 is located near each corner of proof mass 612, and a set of spring mechanisms 622 is located near each corner of proof mass 614. In addition, a pair of Newton stops 624 are located near opposing edges of proof mass 612, and pair of Newton stops 626 are located near opposing edges of proof mass 614.

As shown in FIG. 8, a pair of stop structures 630 is located near opposing edges of proof mass 612 on an overlying sense plate (not shown). Two additional stop structures corresponding to stop structures 630 are also located below proof mass 612 on an underlying sense plate, such that a total of four stop structures are associated with proof mass 612. Likewise, a pair of stop structures 632 is located near opposing edges of proof mass 614 on an overlying sense plate (not shown). Two additional stop structures corresponding to stop structures 632 are located below proof mass 614 on an underlying sense plate, such that a total of four stop structures are associated with proof mass 614.

In addition to the stop structures that constrain vertical ("z" direction, in and out of the page) motion of the proof mass as described above, other stop structures can be implemented between the proof mass and sense or motor-related combs to prevent the combs from touching each other in a "y" direction during operation of a MEMS sensor. For example, such stop structures can prevent motor sense (motor pickoff) comb to proof mass sense comb contact, and motor drive comb to proof mass drive comb contact. A stop gap (space) between the stop structures and the proof mass is sized to prevent shorting at the motor pickoff combs while still preventing proof mass "pull in" due to motor drive or motor pickoff voltages. FIG. 8 further shows an exemplary implementation of additional stop structures 640, which constrain the motion of proof mass 612 in the "y" direction, and additional stop structures 642, which constrain the motion of proof mass 614 in the "y" direction.

Figure 9:
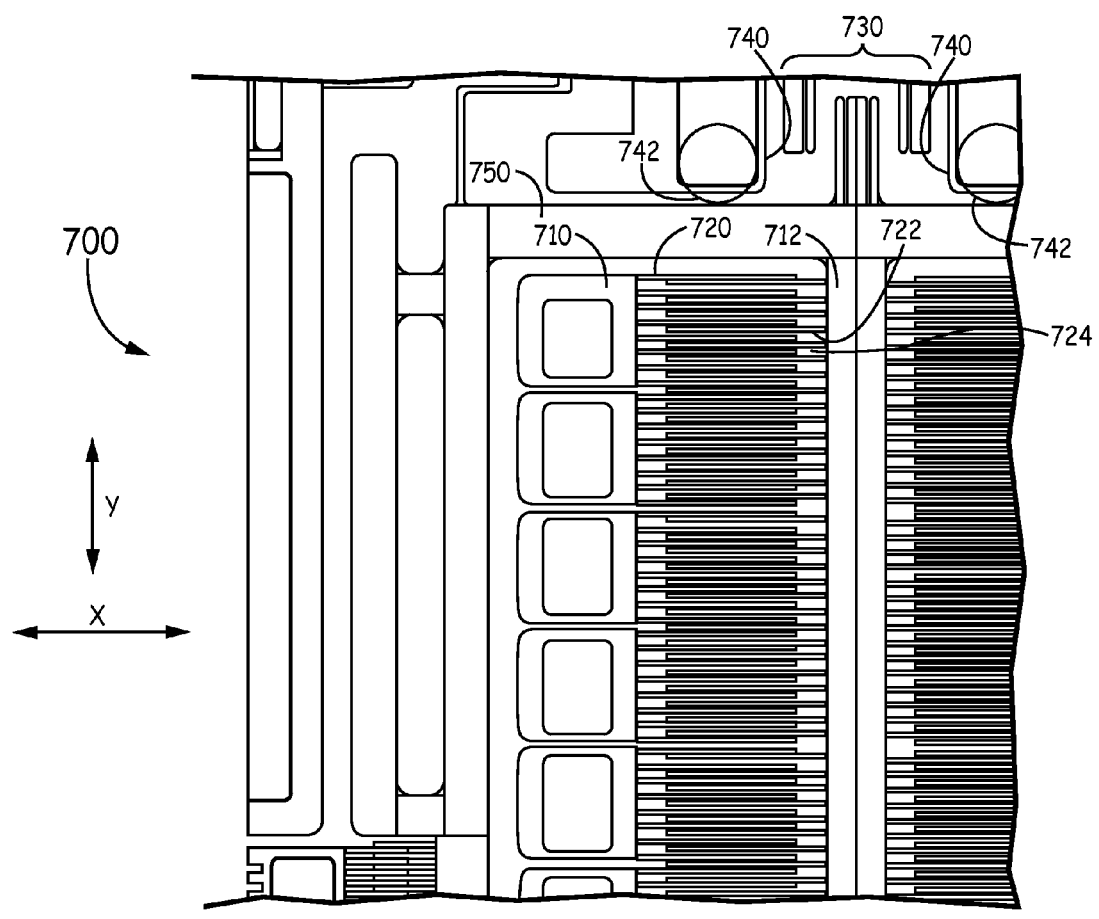
FIG. 9 is a top view of an enlarged portion of a MEMS gyroscope according to one embodiment.

FIG. 9 illustrates further details of exemplary stop structure configurations for a MEMS gyroscope 700 that constrains the proof mass motion in the "y" direction. The MEMS gyroscope 700 includes a plurality of interdigitized combs 710 and 712, which include respective individual comb fingers 720 and 722. The combs fingers 720 and 722 are separated from each other by a sense gap 724 such that they do not touch each other during normal operation. A Newton stop 730 is configured to constrain the movement of comb 712 in the direction of the proof mass motor motion ("x" direction) such that the tips of the comb fingers 722 do not contact comb 710.

A set of stop structures 740 are configured to constrain the proof mass motion in the "y" direction such that individual comb fingers 720 and 722 do not touch each other even during a shock event. The stop structures 740 each include a bumper 742 that abuts against a proof mass frame 750 when MEMS gyroscope 700 is subjected to various operational forces, preventing comb fingers 720 and 722 from touching each other (this scenario is shown in FIG. 9). In one embodiment, stop structures 740 are configured such that a stop gap between bumpers 742 and proof mass frame 750 is from about 25% to about 75% of the dimension of sense gap 724 during normal operation.

Figure 10:
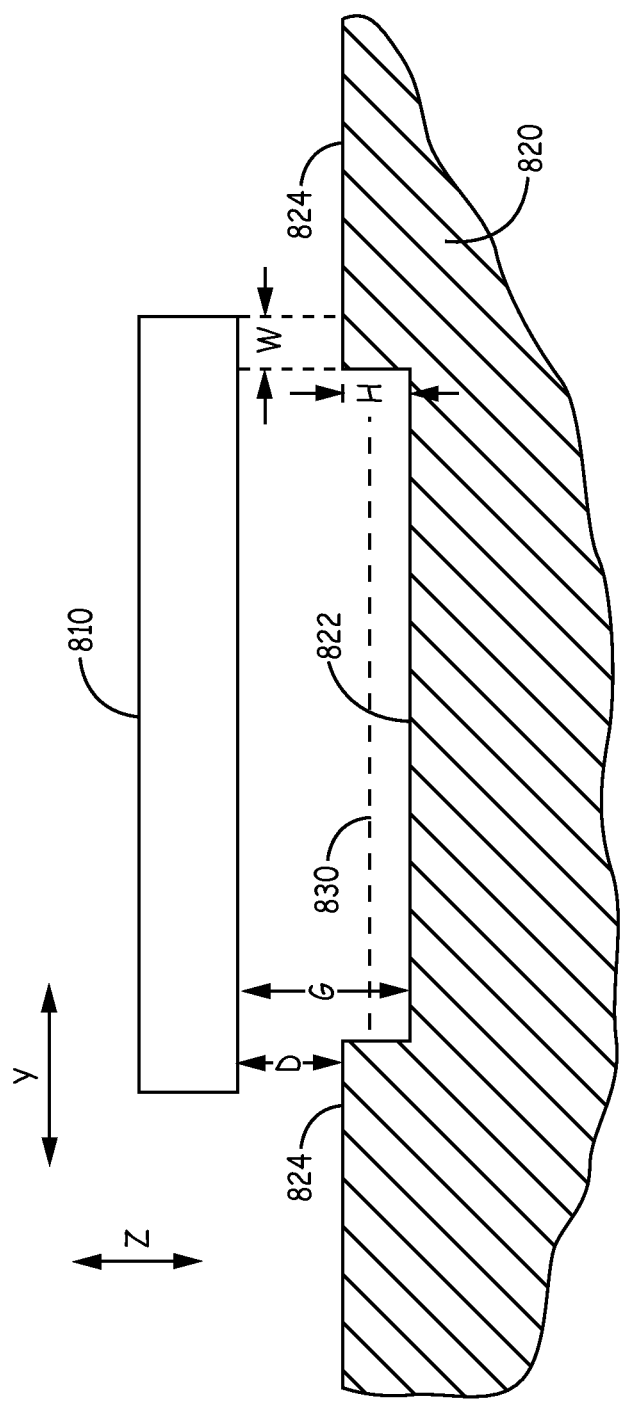
FIG. 10 is an end view of a portion of a MEMS sensor device according to an alternative embodiment.

FIG. 10 depicts an alternative embodiment of a stop structure configuration for a MEMS sensor device that constrains proof mass motion in the "z" direction. The MEMS sensor device includes a proof mass 810 positioned over a sense plate 820. The sense plate has a recessed portion 822 defined by shoulder portions 824, which function as stop structures for proof mass 810. The shoulder portions 824 can define a perimeter of recessed portion 822 around sense plate 820. The recessed portion 822 can be formed by a standard etching process.

The recessed portion 822 is energized by a voltage different from that of proof mass 810. The proof mass 810 is separated from shoulder portions 824 by a stop distance (D), and is separated from recess portion 822 by a sense gap (G). The shoulder portions 824 are configured to have the same voltage as proof mass 810, such that it is not electrically disruptive to the MEMS sensor device if proof mass 810 touches shoulder portions 824 during operation. The dimension (W) in FIG. 10 depicts the overlap of proof mass 810 with shoulder portion 824. This dimension (W) can vary in size along the length and width of proof mass 810.

The line 830 in FIG. 10 represents the proof mass "pull-in" point, where the electrostatic force from the sense bias voltage (between proof mass 810 and sense plate recessed portion 822) is equal to the mechanical spring restoring force for proof mass 810. The Line 830 corresponds to the "Zero Restore Force" point in the graph of FIG. 11. The shoulder portions 824 have a height (H) such that proof mass 810 is stopped from going beyond the pull-in point during a shock event, preventing stick-down of proof mass 810 to sense plate recessed portion 822.

Figure 11:
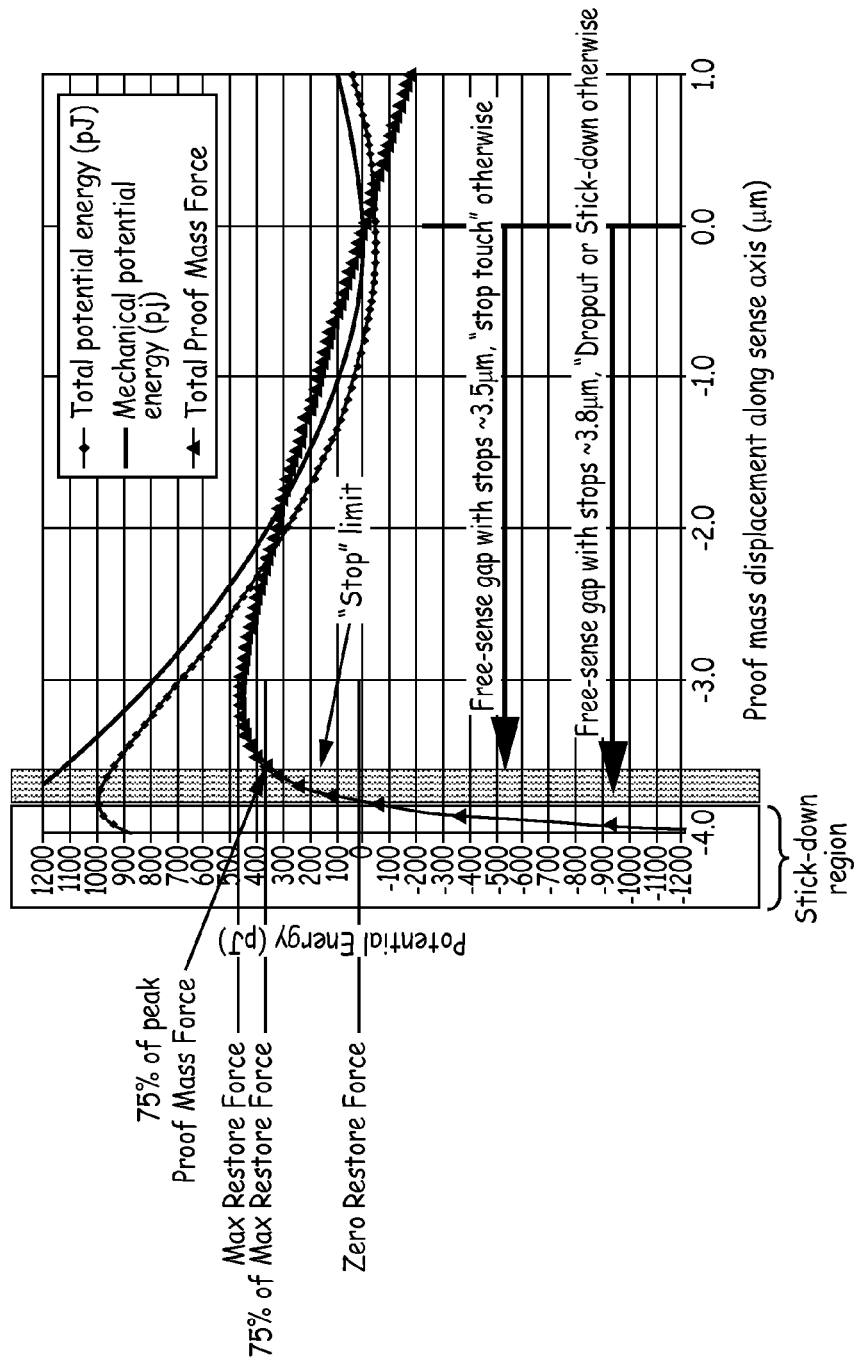
FIG. 11 is a graph showing potential energy vs. proof mass position for a MEMS gyroscope.

FIG. 11 is a graph showing potential energy vs. proof mass position in the sense gap (along the Z direction of FIG. 1) of a MEMS gyroscope, which can be used in the design of the stop structures described in the foregoing embodiments. As shown in the graph, there is an optimum dimension for stop structure height within the sense gap, that (1) maximizes free-sense gap operational area, but also (2) prevents proof mass (or motor combs) deflections from entering the "Stick-down region" of displacement, and (3) at maximum deflection keeps the proof mass Restore Force near its maximum value. This optimal stop dimension is shown in FIG. 11 to be at a point of 75% to 100% of Max Restore Force. As an example, in a sense gap (G) of size 4.0 microns, the optimal stop height would be between 0.4 and 0.9 microns, limiting proof mass displacement along the sense axis to −3.6 and −3.1 microns, respectively, in FIG. 11 (x axis).

Example Embodiments

Example 1 includes a MEMS device comprising at least one proof mass having a first surface and an opposing second surface, the proof mass configured to have a first voltage and a motor motion in a first horizontal direction; a first sense plate separated from the proof mass by a first sense gap, the first sense plate having an inner surface facing the first surface of the proof mass and having a second voltage different than the first voltage; and a first set of stop structures on the inner surface of the first sense plate and electrically isolated from the first sense plate, the first set of stop structures configured to prevent contact of the inner surface of the first sense plate with the proof mass in a vertical direction, the first set of stop structures having substantially the same voltage as that of the proof mass; wherein the first set of stop structures is dimensioned to minimize energy exchange upon contact with the proof mass during a shock or acceleration event.

Example 2 includes the MEMS device of Example 1, further comprising a second sense plate separated from the proof mass by a second sense gap, the second sense plate having an inner surface facing the opposing second surface of the proof mass and having a third voltage that is different than the first and second voltages; and a second set of stop structures on the inner surface of the second sense plate and electrically isolated from the second sense plate, the second set of stop structures configured to prevent contact of the inner surface of the second sense plate with the proof mass in the vertical direction, the second set of stop structures having substantially the same voltage as that of the proof mass; wherein the second set of stop structures is dimensioned to minimize energy exchange upon contact with the proof mass during the shock or acceleration event.

Example 3 includes the MEMS device of Example 2, wherein the first and second sets of stop structures each have substantially the same size and shape.

Example 4 includes the MEMS device of any of Examples 2-3, wherein the first and second sets of stop structures each have a length from about 1% to about 120% of a length of the proof mass and are oriented parallel to the motor motion direction.

Example 5 includes the MEMS device of any of Examples 2-4, wherein the first set of stop structures has a width that is about 0.5 to about 2 times the dimension of the first sense gap, and the second set of stop structures has a width that is about 0.5 to about 2 times the dimension of the second sense gap.

Example 6 includes the MEMS device of any of Examples 2-5, wherein the first set of stop structures has a height that is about 1% to about 25% the dimension of the first sense gap, and the second set of stop structures has a height that is about 1% to about 25% the dimension of the second sense gap.

Example 7 includes the MEMS device of any of Examples 2-6, wherein the first and second sets of stop structures each have a rectangular shaped end view profile.

Example 8 includes the MEMS device of any of Examples 2-6, wherein the first and second sets of stop structures each have a triangular shaped end view profile.

Example 9 includes the MEMS device of any of Examples 2-8, further comprising a third set of stop structures configured to constrain motion of the proof mass in a second horizontal direction that is perpendicular to the first horizontal direction.

Example 10 includes the MEMS device of Example 9, further comprising a plurality of interdigitized comb fingers coupled to the proof mass, wherein the third set of stop structures is configured to prevent the interdigitized comb fingers from touching each other while the MEMS device is operating during a shock or acceleration event.

Example 11 includes the MEMS device of any of Examples 1-10, wherein the MEMS device comprises a gyroscope or an accelerometer.

Example 12 includes a MEMS sensor device comprising at least one proof mass having a first voltage and a motor motion in a first horizontal direction; a plurality of interdigitized comb fingers coupled to the proof mass; at least one sense plate separated from the proof mass by a sense gap, the sense plate having a second voltage different than the first voltage; a first set of stop structures on the sense plate and electrically isolated from the sense plate, the first set of stop structures configured to constrain motion of the proof mass in a vertical direction that is perpendicular to the first horizontal direction, the first set of stop structures configured to prevent contact of the sense plate with the proof mass during a shock or acceleration event; and a second set of stop structures adjacent to the proof mass and configured to constrain motion of the proof mass in a second horizontal direction that is perpendicular to the first horizontal direction, such that the interdigitized comb fingers are prevented from touching each other during the shock or acceleration event; wherein the first and second sets of stop structures are electrically neutral with respect to the proof mass, the first and second sets of stop structures dimensioned to minimize energy exchange upon contact with the proof mass during the shock or acceleration event; wherein the first set of stop structures has a height such that restorative forces acting on the proof mass are maintained, and stick-down of the proof mass to the sense plate is prevented while maintaining maximum free travel of the proof mass within the sense gap.

Example 13 includes the MEMS sensor device of Example 12, wherein the first set of stop structures comprises rail-shaped structures.

Example 14 includes the MEMS sensor device of Example 12, wherein the first set of stop structures comprises shoulder portions that define a perimeter of a recessed portion around the sense plate.

Example 15 includes a method of fabricating a MEMS sensor device for robust operation during a shock or acceleration event, the method comprising forming a first set of stop structures on a surface of at least one sense plate, the first set of stop structures formed with a height sufficient to constrain motion of a proof mass in a vertical direction to prevent contact between the proof mass and the surface of the sense plate during the shock or acceleration event, the proof mass having a motor motion in a first horizontal direction; forming a second set of stop structures that are configured to constrain motion of the proof mass in a second horizontal direction that is perpendicular the first horizontal direction to prevent a plurality of interdigitized comb fingers from touching each other during the shock or acceleration event, the interdigitized comb fingers coupled to the proof mass; and configuring the first and second sets of stop structures to have substantially the same voltage as that of the proof mass.

Example 16 includes the method of fabricating the MEMS sensor device of Example 15, wherein the first set of stop structures is formed by etching the surface of the sense plate to form rail-shaped structures on opposing sides of the sense plate.

Example 17 includes the method of fabricating the MEMS sensor device of Example 15, wherein the first set of stop structures is formed by depositing a material on the surface of the sense plate to form rail-shaped structures on opposing sides of the sense plate.

Example 18 includes the method of fabricating the MEMS sensor device of Example 15, wherein the first set of stop structures is formed by etching the inner surface of the sense plate to form a recessed portion defined by shoulder portions that act as the first set of stop structures.

Example 19 includes the method of fabricating the MEMS sensor device of any of Examples 15-18, wherein the first set of stop structures is formed to have a size and shape to minimize frictional loss of proof mass momentum upon touch between the proof mass and the first set of stop structures.

Example 20 includes the method of fabricating the MEMS sensor device of any of Examples 15-19, wherein the first set of stop structures is formed at a selected height that allows for maximum proof mass displacement before contact of the first set of stop structures by the proof mass, while also ensuring maximizing proof mass restoration force at the maximum proof mass displacement.

The present invention may be embodied in other forms without departing from its essential characteristics. The described embodiments are to be considered in all respects only as illustrative and not restrictive. Therefore, it is intended that this invention be limited only by the claims and the equivalents thereof.

What is claimed is:

1. A micro-electro-mechanical systems (MEMS) device, comprising:
    at least one proof mass having a first surface and an opposing second surface, the proof mass configured to have a first voltage and a motor motion in a first horizontal direction;
    a plurality of interdigitized comb fingers coupled to the proof mass;
    a first sense plate separated from the proof mass by a first sense gap, the first sense plate having an inner surface facing the first surface of the proof mass and having a second voltage different than the first voltage;
    a first set of stop structures on the inner surface of the first sense plate and electrically isolated from the first sense plate, the first set of stop structures configured to prevent contact of the inner surface of the first sense plate with the proof mass in a vertical direction, the first set of stop structures having substantially the same voltage as that of the proof mass;
    a second sense plate separated from the proof mass by a second sense gap, the second sense plate having an inner surface facing the opposing second surface of the proof mass and having a third voltage that is different than the first and second voltages;
    a second set of stop structures on the inner surface of the second sense plate and electrically isolated from the second sense plate, the second set of stop structures configured to prevent contact of the inner surface of the second sense plate with the proof mass in the vertical direction, the second set of stop structures having substantially the same voltage as that of the proof mass; and
    a third set of stop structures configured to constrain motion of the proof mass in a second horizontal direction that is perpendicular to the first horizontal direction, the third set of stop structures configured to prevent the interdigitized comb fingers from touching each other while the MEMS device is operating during a shock or acceleration event;
    wherein the first and second set of stop structures is dimensioned to minimize energy exchange upon contact with the proof mass during a shock or acceleration event;
    wherein the interdigitized comb fingers are each separated from each other by a third sense gap, the third set of stop structures located off of the first and second sense plates such that stop gaps between the third set of stop structures and the proof mass have a dimension from about 25% to about 75% of a dimension of the third sense gap during normal operation.

2. The MEMS device of claim 1, wherein the first and second sets of stop structures each have substantially the same size and shape.

3. The MEMS device of claim 1, wherein the first and second sets of stop structures each have a length from about 1% to about 120% of a length of the proof mass and are oriented parallel to the motor motion direction.

4. The MEMS device of claim 1, wherein the first set of stop structures has a width that is about 0.1 to about 2 times the dimension of the first sense gap, and the second set of stop structures has a width at is about 0.1 to about 2 times the dimension of the second sense gap.

5. The MEMS device of claim 1, wherein the first set of stop structures has a height that is about 1% to about 25% the dimension of the first sense gap, and the second set of stop structures has a height that is about 1% to about 25% the dimension of the second sense gap.

6. The MEMS device of claim 1, wherein the first and second sets of stop structures each have a rectangular shaped end view profile.

7. The MEMS device of claim 1, wherein the first and second sets of stop structures each have a triangular shaped end view profile.

8. The MEMS device of claim 1, wherein the MEMS device comprises a gyroscope or an accelerometer.

9. A micro-electro-mechanical systems (MEMS) sensor device, comprising:
    at least one proof mass having a first voltage and a motor motion in a first horizontal direction;
    a plurality of interdigitized comb fingers coupled to the proof mass;
    at least one sense plate separated from the proof mass by a sense gap, the sense plate having a second voltage different than the first voltage;
    a first set of stop structures on the sense plate and electrically isolated from the sense plate, the first set of stop structures configured to constrain motion of the proof mass in a vertical direction that is perpendicular to the first horizontal direction, the first set of stop structures configured to prevent contact of the sense plate with the proof mass during a shock or acceleration event; and
    another set of stop structures adjacent to the proof mass and configured to constrain motion of the proof mass in a second horizontal direction that is perpendicular to the first horizontal direction, such that the interdigitized comb fingers are prevented from touching each other during the shock or acceleration event;
    wherein the stop structures are electrically neutral with respect to the proof mass, the stop structures dimensioned to minimize energy exchange upon contact with the proof mass during the shock or acceleration event;
    wherein the first set of stop structures has a height such that restorative forces acting on the proof mass are maintained, and stick-down of the proof mass to the sense plate is prevented while maintaining maximum free travel of the proof mass within the sense gap;
    wherein the interdigitized comb fingers are each separated from each other by another sense gap, the another set of stop structures located off of the sense plate such that stop gaps between the another set of stop structures and the proof mass have a dimension from about 25% to about 75% of a dimension of the another sense gap during normal operation.

10. The MEMS sensor device of claim 9, wherein the first set of stop structures comprises rail-shaped structures.

11. The MEMS sensor device of claim 9, wherein the first set of stop structures comprises shoulder portions that define a perimeter of a recessed portion around the sense plate.

12. A method of fabricating a micro-electro-mechanical systems (MEMS) sensor device for robust operation during a shock or acceleration event, the method comprising:
   forming a first set of stop structures on a surface of at least one sense plate, the first set of stop structures formed with a height sufficient to constrain motion of a proof mass in a vertical direction to prevent contact between the proof mass and the surface of the sense plate during the shock or acceleration event, the proof mass having a motor motion in a first horizontal direction;
   forming another set of stop structures that are configured to constrain motion of the proof mass in a second horizontal direction that is perpendicular the first horizontal direction to prevent a plurality of interdigitized comb fingers from touching each other during the shock or acceleration event, the interdigitized comb fingers coupled to the proof mass; and
   configuring the stop structures to have substantially the same voltage as that of the proof mass;
   wherein the interdigitized comb fingers are each separated from each other by a sense gap, the another set of stop structures located off of the sense plate such that stop gaps between the another set of stop structures and the proof mass have a dimension from about 25% to about 75% of a dimension of normal operation.

13. The method of claim 12, wherein the first set of stop structures is formed by etching the surface of the sense plate to form rail-shaped structures on opposing sides of the sense plate.

14. The method of claim 12, wherein the first set of stop structures is formed by depositing a material on the surface of the sense plate to form rail-shaped structures on opposing sides of the sense plate.

15. The method of claim 12, wherein the first set of stop structures is formed by etching the inner surface of the sense plate to form a recessed portion defined by shoulder portions that act as the first set of stop structures.

16. The method of claim 12, wherein the first set of stop structures is formed to have a size and shape to minimize frictional loss of proof mass momentum upon touch between the proof mass and the first set of stop structures.

17. The method of claim 12, wherein the first set of stop structures is formed at a selected height that allows for maximum proof mass displacement before contact of the first set of stop structures by the proof mass, while also ensuring maximizing proof mass restoration force at the maximum proof mass displacement.

* * * * *